(12) United States Patent
West

(10) Patent No.: US 8,643,985 B2
(45) Date of Patent: Feb. 4, 2014

(54) PHOTOVOLTAIC BIPOLAR TO MONOPOLAR SOURCE CIRCUIT CONVERTER WITH FREQUENCY SELECTIVE GROUNDING

(75) Inventor: Richard T. West, Ragged Point, CA (US)

(73) Assignee: Schneider Electric Solar Inverters USA, Inc., Livermore, CA (US)

( * ) Notice: Subject to any disclaimer, the term of this patent is extended or adjusted under 35 U.S.C. 154(b) by 832 days.

(21) Appl. No.: 12/842,111

(22) Filed: Jul. 23, 2010

(65) Prior Publication Data

US 2012/0019964 A1    Jan. 26, 2012

(51) Int. Cl.
 *H02H 9/08*    (2006.01)
(52) U.S. Cl.
 USPC .......................................................... 361/42
(58) Field of Classification Search
 USPC .......................................................... 361/42
 See application file for complete search history.

(56) References Cited

U.S. PATENT DOCUMENTS

| | | | |
|---|---|---|---|
| 7,102,379 B2 * | 9/2006 | Hobelsberger et al. | 324/765.01 |
| RE42,039 E * | 1/2011 | West et al. | 363/132 |
| 2006/0237057 A1 * | 10/2006 | Buij et al. | 136/244 |
| 2008/0218917 A1 * | 9/2008 | Archer | 361/33 |
| 2008/0291706 A1 | 11/2008 | Seymour et al. | |
| 2009/0003024 A1 * | 1/2009 | Knaup | 363/124 |
| 2009/0190275 A1 | 7/2009 | Gilmore et al. | |
| 2009/0283130 A1 | 11/2009 | Gilmore et al. | |
| 2011/0199707 A1 * | 8/2011 | Kazemi et al. | 361/47 |
| 2012/0019964 A1 * | 1/2012 | West | 361/42 |
| 2012/0039003 A1 * | 2/2012 | West | 361/42 |
| 2012/0043923 A1 * | 2/2012 | Ikriannikov et al. | 320/103 |
| 2012/0274138 A1 * | 11/2012 | Bundschuh et al. | 307/64 |
| 2013/0009851 A1 * | 1/2013 | Danesh | 343/904 |
| 2013/0088086 A1 * | 4/2013 | Coors et al. | 307/72 |

OTHER PUBLICATIONS

International Search Report mailed Jul. 17, 2012 which issued in corresponding International Patent Application No. PCT/US2011/044112 (4 pages).

Written Opinion mailed Jul. 17, 2012 which issued in corresponding International Patent Application No. PCT/US2011/044112 (6 pages).

* cited by examiner

*Primary Examiner* — Ronald W Leja

(57) ABSTRACT

An electrical power converter for converting power from a bipolar DC source to supply an AC load is disclosed. For one such embodiment the bipolar DC source is a photovoltaic array and the AC power is sourced into an electric power grid. The bipolar photovoltaic array has positive and negative voltage potentials with respect to earth ground. The converter is a utility interactive inverter which does not require an isolation transformer at the electric power grid interface. Embodiments of the invention include methods of detecting and interrupting DC ground faults in the photovoltaic array.

13 Claims, 3 Drawing Sheets

PHOTOVOLTAIC BIPOLAR TO MONOPOLAR SOURCE CIRCUIT CONVERTER WITH FREQUENCY SELECTIVE GROUNDING

FIELD OF THE INVENTION

The present invention relates to electrical power converters and, more specifically, to a photovoltaic bipolar-to-monopolar source converter used in conjunction with other equipment to supply AC loads.

BACKGROUND OF THE INVENTION

In the United States, two solar photovoltaic (PV) array configurations, grounded and ungrounded, are permitted by the National Electric Code (NEC), Section 690. The maximum voltage of a PV array is currently limited to 600 Vdc with respect to earth in grounded systems and 600 Vdc in ungrounded systems because of PV module insulation limitations. The NEC also requires that PV systems installed on dwellings have a means of detecting and interrupting fault currents from the PV array to earth ground. These faults are commonly caused by water intrusion into wiring junction boxes, degradation of the array wiring insulation, or a failure in the solar module insulating materials. Such faults can cause a low energy leakage path or a destructive direct current arc. The intent of the code, with respect to ground faults, is fire protection, not personnel protection.

SUMMARY

One embodiment provides an apparatus for selectively coupling and de-coupling at least two monopolar DC sources to and from an earth ground and positive and negative terminals of a monopolar load. A bipolar DC source that includes at least two monopolar DC sources is controllably coupled series aiding with a common connection point to earth ground, a positive connection to a positive monopolar load terminal, and a negative connection to a negative monopolar load terminal, with the stated polarities referenced to said earth ground. A frequency-selective network connected between the common connection point and the earth ground has a DC impedance that is lower than the AC impedance of the network at a preselected frequency, such as an integral multiple of the utility line frequency.

In one implementation, the DC impedance of the frequency-selective network is low enough to hold the common ground connection at substantially ground potential as required by the National Electric Code, and the AC impedance is low enough to prevent the common mode potential of the bipolar array from being raised above earth ground at lightning transient frequencies.

A DC-to-AC converter may be coupled to the bipolar DC source for converting a DC output of that source to an AC output, and the frequency-selective network may be a parallel RLC circuit having a resonant frequency that is about three times the frequency of the AC output. Specifically, the frequency-selective network may be a parallel RLC circuit in which the R, L and C values provide a low DC impedance, a maximum AC impedance at a resonant frequency that is about three times the frequency of the AC output, and a lower AC impedance at frequencies higher than the resonant frequency. The frequency-selective network preferably allows the common connection point to operate with an impressed common mode AC voltage with respect to earth ground, with an AC current to ground that is lower than the AC current in a direct connection of the common connection point to earth ground.

One embodiment includes a ground fault detector coupled to each of the monopolar DC sources to produce a ground fault signal when a ground fault occurs, and a controller responsive to the ground fault signal for de-coupling the faulted monopolar DC source from the common connection point. Any unfaulted monopolar DC source preferably floats with the highest voltage at the poles of any unfaulted monopolar DC source equal to ±½ the open circuit voltage of the unfaulted monopolar DC source with respect to the earth ground, when a faulted monopolar DC source is de-coupled from the common connection point.

Other features and advantages of embodiments of the present invention will be apparent from the accompanying drawings, and from the detailed description, that follows below.

BRIEF DESCRIPTION OF THE DRAWINGS

The invention will be better understood from the following description of preferred embodiments together with reference to the accompanying drawings, in which.

DETAILED DESCRIPTION

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 1:
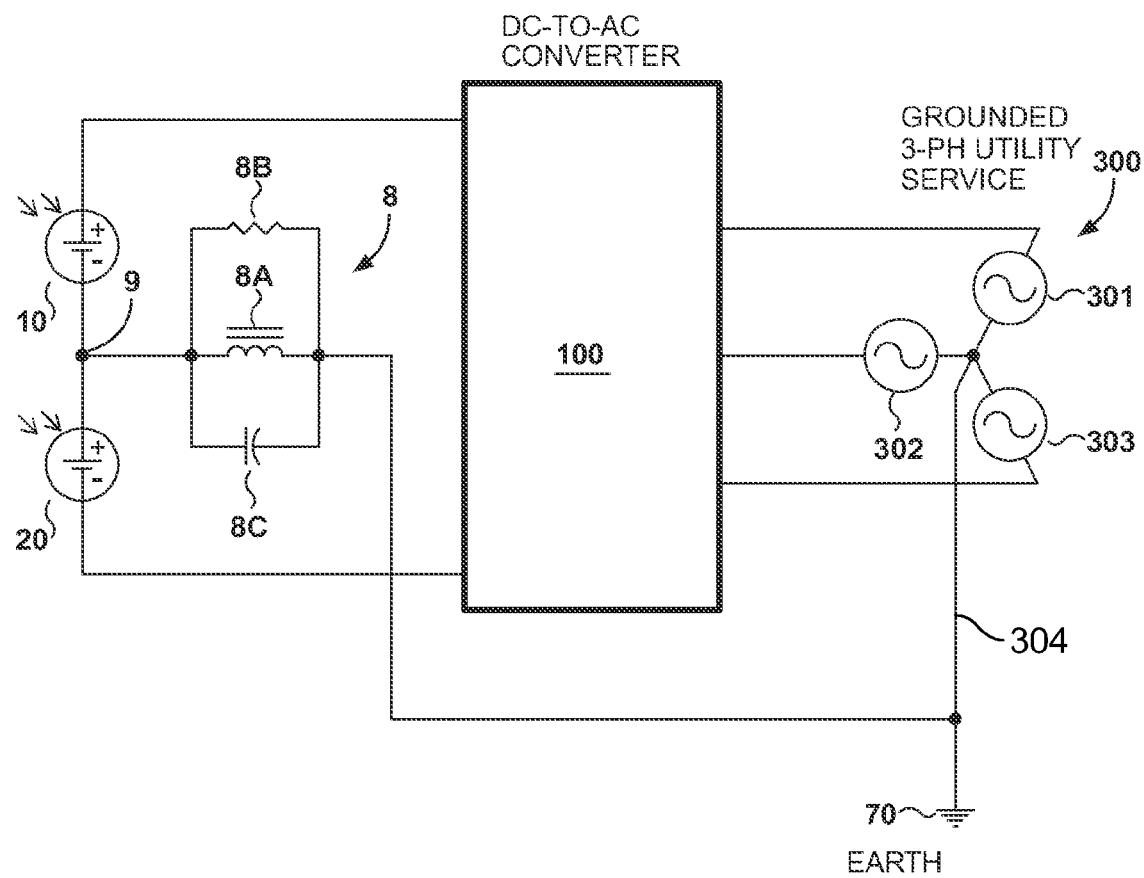
FIG. 1 is an electrical schematic of a bipolar DC power source coupled to earth ground and to a utility grid via a DC-to-AC converter.

FIG. 1 illustrates a system configured with a bipolar DC source that includes two monopolar PV subarrays 10 and 20 (e.g., maximum 600 volts each), and a three-phase DC-to-AC power converter 100 operating into a grounded-Wye AC utility service 300 (e.g., 480/277-volt, 60 Hz) that includes three phases 301-303 connected to earth ground 70 through a common neutral line 304. The DC-to-AC converter 100 may be a conventional 6-pole bridge that includes six transistor/diode switches and three filter inductors connected to the three phases 301-303 of the utility service. Since the connection at the utility grid 300 is a four-wire, grounded-Wye configuration, and the DC source is ground referenced as well, each of the three phases operates independently. Control and regulation methodologies for utility grid interactive inverters are well known.

The positive terminal of the first PV subarray 10 and the negative terminal of the second PV subarray 20 are connected to the DC-to-AC converter 100. The other terminals of the subarrays 10 and 20 are connected to earth ground 70 through a frequency-selective RLC network 8 for grounding the photovoltaic arrays through a network that provides a level of DC system protection equivalent to a solidly grounded system and also allows the PV arrays to move with common mode AC voltages. In the illustrative system, the RLC network 8 is formed by an inductor 8A, a resistor 8B and a capacitor 8C connected in parallel. The parallel RLC network 8 has an AC impedance that is a maximum at a resonant frequency, and decreases at frequencies above the resonant frequency. The values of the components 8A-8C are preferably selected to provide a resonant frequency that is about three times the line frequency of the AC power to be supplied to an AC load (e.g., a resonant frequency of 180 Hz for a 60-Hz line frequency) and a DC impedance that is lower than the AC impedance of the network at its resonant frequency. Specifically, the DC impedance of the parallel RLC network 8 is preferably low enough to hold the potential at the terminal 9 at substantially ground potential as required by the National Electric Code for bipolar photovoltaic arrays. The AC impedance at the resonant frequency is preferably low enough to prevent the common mode potential of the bipolar array from being raised above earth ground at lightning transient frequencies.

In one example using an inductor 8A of 656 millihenries, a resistor 8B of 371 ohms and a capacitor 8C of 1.2 microfarads, the voltage between earth ground 70 and the RLC network 8 is about 37 Vac rms at 180 Hz, under nominal operating conditions when the power converter 100 is sourcing power into the utility grid 300. The DC voltage component to ground is zero. The current flowing in the neutral conductor 304 is about 200 milliamperes at a frequency of 180 hertz. Power dissipation in the resistor 8B is about 4 watts.

For the example shown in FIG. 1, the DC grounding resistance is effectively the DC resistance of the inductor 8A, which can be less than one ohm. The AC grounding impedance is 186 ohms at 180 Hz and much lower at frequencies above 180 Hz to provide a low-impedance return path for lightning induced transients, which have frequencies substantially higher than 180 Hz. Thus, the RLC network 8 provides a frequency selective network that provides a level of system protection equivalent to that of a solidly grounded bipolar PV array during normal operation.

Figure 2:
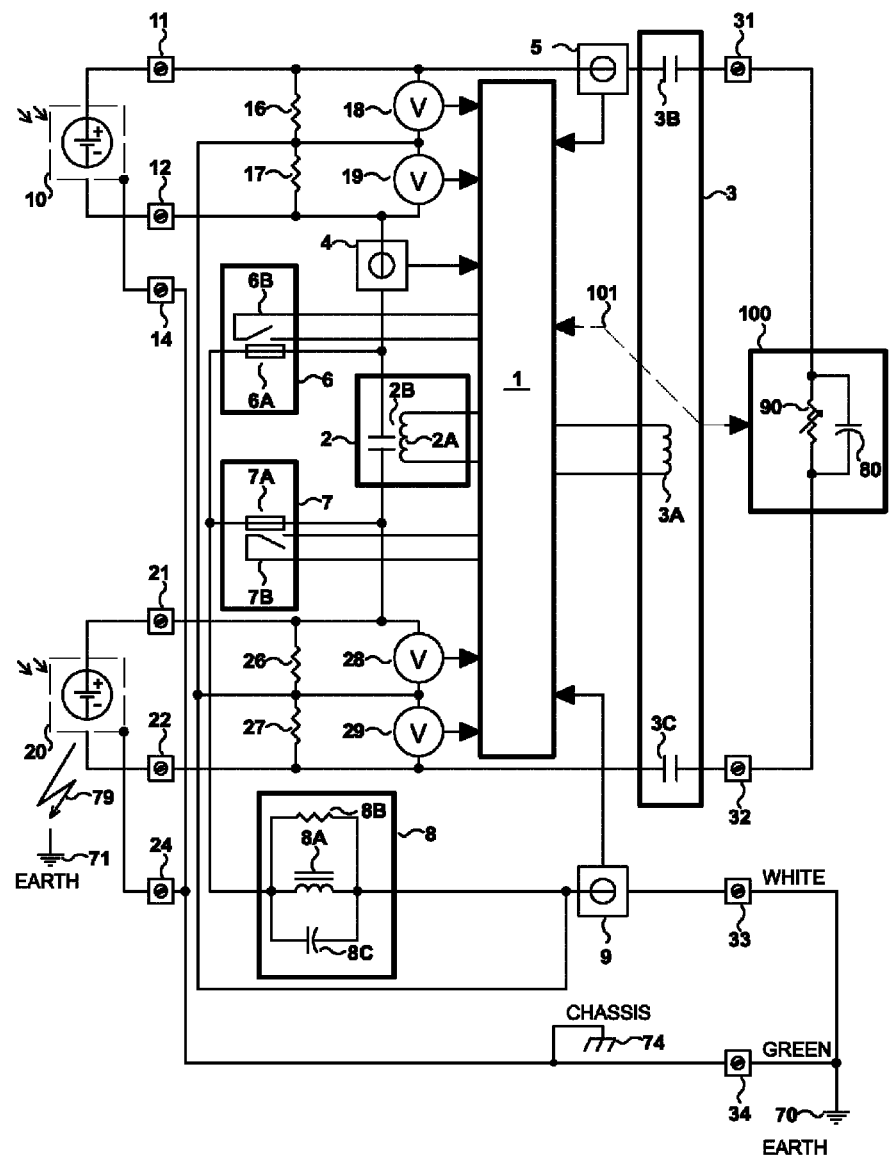
FIG. 2 is an electrical schematic of one embodiment of the system of FIG. 1, with the DC-to-AC converter modeled as a variable load.

FIG. 2 is a more detailed schematic diagram of one implementation of the system of FIG. 1, but with the conventional DC-to-AC converter modeled as a variable load 90 and a parallel capacitor 80. In normal operation, the monopolar PV arrays 10 and 20 are connected to earth ground 50 through a pair of indicating fuses 6A and 7A and a frequency-selective RLC network 8. The negative pole of the subarray 10, at terminal 12, and the positive pole of the subarray 20, at terminal 21, are ground referenced in this way. The currents through the fuses 6A and 7A are effectively zero during normal operation.

When a fault to ground occurs in either PV array 10 or 20 and produces a DC fault current large enough to clear either of the fuses 6A, 7A, the clearing of the fuse interrupts the ground fault current. At the same time, a blown-fuse indicator signal is sent to a controller 1 by the closing of the switch 6B or 7B associated with the cleared fuse, i.e., the indicating fuses serve as a ground fault detectors that produce ground fault signals when a ground fault occurs, in addition to interrupting the ground fault current. The blown-fuse indicator signal causes the controller 1 to de-energize a contactor coil 2A to open contact 2B, so that the faulted PV subarray is then connected to earth ground only through the ground fault impedance and one of the equal-valued resistor networks formed by respective resistor pairs 16, 17 and 26, 27. During this fault mode of operation, any un-faulted subarrays will "float" with the highest voltages at the subarray poles equal to ±½ the subarray open circuit voltage with respect to the earth ground 70. The resistor networks 16, 17 and 26, 27 provide a minimally dissipative common mode voltage reference and are used to bleed off subarray static charges.

From a cost standpoint, it is desirable to use PV modules, wiring and fuses just below the maximum voltage permitted for a given class of equipment. For an optimum bipolar array, therefore, the highest DC voltage with respect to ground at terminals 11 and 22, under all conditions, is the rated DC equipment voltage. With soft or resistively grounded bipolar PV arrays, the occurrence of a hard (low impedance) DC ground fault at terminal 11, for example, reduces the voltage at that terminal with respect to ground to zero, which means the voltage at terminal 22 with respect to ground is twice the allowable equipment voltage because the impedance of the fault may be much lower than the impedance of the resistive ground. To alleviate this problem, the illustrative system monitors the voltage, with respect to ground, on all the PV subarray terminals 11, 12 and 21, 22 with voltage sensors 18, 19 and 28, 29 across the respective resistors 16, 17 and 26, 27. The controller 1 reads scaled voltage signals from the voltage sensors 18, 19 and 28, 29 and compares these values to preprogrammed overvoltage limits. If the limit is exceeded on any terminal, both PV subarrays 10 and 20 are disabled and "floated." The disabling sequence works as follows:

1. The voltage with respect to ground on at least one of the terminals 11, 12, and 21, 22 exceeds the preprogrammed limit for that terminal.

2. The controller 1 commands a load 100 (e.g., a DC-to-AC converter) to shut down, via an isolated serial link 101, thereby effectively setting the resistive portion of the load 100 to an open circuit.

3. Concurrently with the load shutdown, a contactor coil 3A is de-energized to open contacts 3B and 3C.

4. After a delay to ensure that the contacts are fully open, a pair of current sensors 4 and 5 are read to verify that the load current commutation is complete.

The PV subarrays 10 and 20 are also disabled if the ground current read by a current sensor 9 exceeds a preprogrammed limit. In either case, steps 2 through 4 of the disabling sequence are executed.

Figure 3:
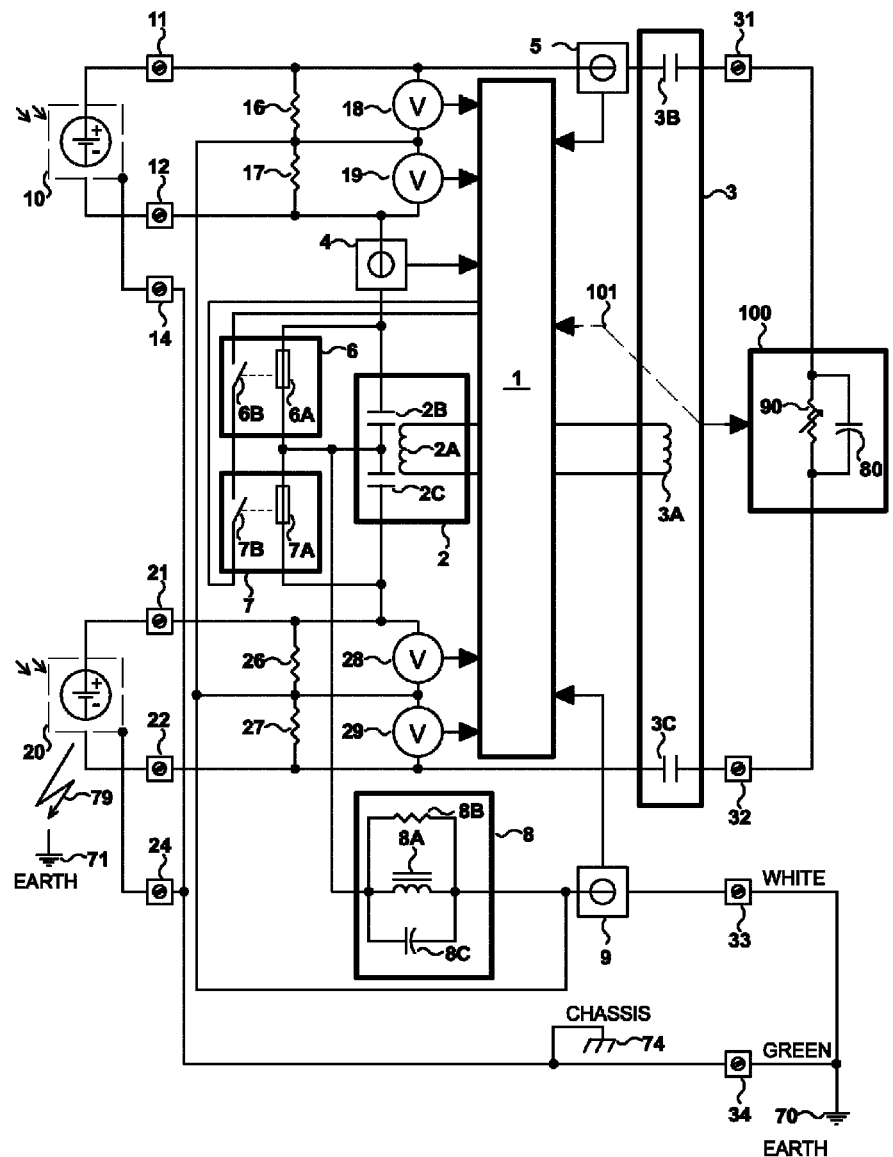
FIG. 3 is an electrical schematic of another embodiment of the system of FIG. 1, with the DC-to-AC converter modeled as a variable load.

FIG. 3 is a schematic diagram of another implementation of the system of FIG. 1, again with the conventional DC-to-AC converter modeled as a variable load. This system is the same as that shown in FIG. 2 except that the DC contactor 2 has two contacts 2A and 2B, which are connected in parallel with the two fuses 6A and 7A, respectively. As in the system of FIG. 2, when a fault to ground occurs in either PV array 10 or 20 and produces a fault current large enough to clear either of the fuses 6A, 7A, the clearing of the fuse interrupts the ground fault current. At the same time, a blown-fuse indicator signal is sent to a controller 1 by the closing of the switch 6B or 7B associated with the cleared fuse. This causes the controller 1 to de-energize a contactor coil 2A to open both contacts 2B and 2C, so that the faulted PV subarray is then connected to earth ground only through the ground fault impedance and one of the equal-valued resistor networks formed by respective resistor pairs 16, 17 and 26, 27. During this fault mode of operation, any un-faulted subarrays will "float" with the highest voltages at the subarray poles equal to ±½ the subarray open circuit voltage with respect to the earth ground 70. The resistor networks 16, 17 and 26, 27 provide a minimally dissipative common mode voltage reference by bleeding off subarray static charges. The use of the dual contacts 2A and 2B in the system of FIG. 3 changes the rating requirements for each contact, which can reduce the cost of the contactor.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. Apparatus for selectively coupling and de-coupling first and second monopolar DC sources to and from an earth ground and positive and negative terminals of a monopolar load, comprising:
   a bipolar DC source that includes said first and second monopolar DC sources each having positive and negative terminals, with the positive terminal of said first monopolar DC source and the negative terminal of said second monopolar DC source connected to a DC-to-AC converter, the negative terminal of said first monopolar DC source and the positive terminal of said second monopolar DC source being connected to each other at a common connection point that is also connected to earth ground, with the stated polarities referenced to said earth ground, and
   a single network of frequency-selective parallel-connected RLC devices connected between said common connection point and said earth ground, said network having a DC impedance that is lower than the AC impedance of said network at a preselected frequency.

2. The apparatus of claim 1 in which said DC impedance is low enough to hold said common ground connection at substantially ground potential during a DC ground fault.

3. The apparatus of claim 1 in which said AC impedance is low enough to prevent the common mode potential of said bipolar array from being raised above earth ground at lightning transient frequencies.

4. The apparatus of claim 1 which includes a DC-to-AC converter coupled to said bipolar DC source for converting a DC output of said source to an AC output, and in which said frequency-selective network is a parallel RLC circuit having a resonant frequency that is about three times the frequency of said AC output.

5. The apparatus of claim 4 in which said frequency-selective network is a parallel RLC circuit in which the R, L and C values provide a low DC impedance, a maximum AC impedance at a resonant frequency that is about three times the frequency of said AC output, and a lower AC impedance at frequencies higher than said resonant frequency.

6. The apparatus of claim 1 which includes a ground fault detector coupled to each of said monopolar DC sources to produce a ground fault signal when a ground fault occurs, and a controller responsive to said ground fault signal for de-coupling the faulted monopolar DC source from said common connection point.

7. The apparatus of claim 6 in which said ground fault detector is an indicating fuse.

8. The apparatus of claim 1 in which said frequency-selective network allows said common connection point to operate with an impressed common mode AC voltage with respect to earth ground, with an AC current to ground that is lower than the AC current in a direct connection of said common connection point to earth ground.

9. The apparatus of claim 1 in which any unfaulted monopolar DC source floats with the highest voltage at the poles of any unfaulted monopolar DC source equal to ±½ the open circuit voltage of said unfaulted monopolar DC source with respect to the earth ground, when a faulted monopolar DC source is de-coupled from said common connection point.

10. The apparatus of claim 1 in which said monopolar DC sources are photovoltaic arrays.

11. The apparatus of claim 1 in which said preselected frequency is an integral multiple of the utility line frequency.

12. A method of selectively coupling and de-coupling first and second monopolar DC sources to and from an earth ground and positive and negative terminals of a DC-to-AC converter, said method comprising
   controllably coupling said first and second monopolar DC sources, each having positive and negative terminals, with the positive terminal of said first monopolar DC source and the negative terminal of said second monopolar DC source connected to a DC-to-AC converter, the negative terminal of said first monopolar DC source and the positive terminal of said second monopolar DC source being connected to each other at a common connection point that is also connected to earth ground, and
   coupling said common connection point to said earth ground through a single network of frequency-selective parallel-connected RLC devices, said network having a DC impedance that is lower than the AC impedance of said network at a preselected frequency.

13. The method of claim 12 which includes preventing the system from moving with DC common mode voltages with respect to a system ground point while allowing said system to move with AC common mode voltages with respect to the system ground point, with reduced AC ground currents compared to a system with solid AC and DC grounding.

* * * * *